(12) United States Patent
Cherone et al.

(10) Patent No.: US 7,505,253 B2
(45) Date of Patent: Mar. 17, 2009

(54) RETENTION MECHANISM FOR MOBILE MONITORS

(75) Inventors: Rocco A. Cherone, Layton, UT (US); David E. Barker, Salt Lake City, UT (US); Jan D. Bruening, Riverton, UT (US)

(73) Assignee: General Electric Company, Schenectady, NY (US)

( * ) Notice: Subject to any disclaimer, the term of this patent is extended or adjusted under 35 U.S.C. 154(b) by 766 days.

(21) Appl. No.: 10/993,230

(22) Filed: Nov. 18, 2004

(65) Prior Publication Data

US 2006/0104014 A1  May 18, 2006

(51) Int. Cl.
*H05K 5/00* (2006.01)
*H05K 7/00* (2006.01)
*G06F 1/16* (2006.01)

(52) U.S. Cl. ........................................ 361/681
(58) Field of Classification Search ............... 361/681, 361/682, 683; 292/95, 121, 122, 128, 219, 292/220, 228, 304
See application file for complete search history.

(56) References Cited

U.S. PATENT DOCUMENTS

| 164,941 | A | * | 6/1875 | Schneider ................... 292/128 |
| 336,714 | A | * | 2/1886 | Harrington .................. 292/128 |
| 691,520 | A | * | 1/1902 | Ballard ......................... 292/78 |
| 2,028,954 | A | * | 1/1936 | Roedding .................... 292/126 |
| 2,288,926 | A | * | 7/1942 | Strader ......................... 292/99 |
| 2,898,138 | A | * | 8/1959 | Noord ......................... 292/122 |
| 3,806,174 | A | * | 4/1974 | Herman ....................... 292/113 |
| 4,734,874 | A | * | 3/1988 | Hwang et al. ............... 361/682 |
| 5,348,355 | A | * | 9/1994 | Oyha ........................... 292/11 |
| 5,383,699 | A | * | 1/1995 | Woziekonski et al. ..... 296/65.09 |
| 5,569,895 | A | * | 10/1996 | Lynch et al. ................. 235/1 R |
| 5,738,392 | A | | 4/1998 | Portman |
| 5,802,770 | A | | 9/1998 | Kavanagh et al. |
| 5,938,286 | A | * | 8/1999 | Jones et al. ............. 297/378.12 |
| 6,373,536 | B1 | * | 4/2002 | Mell et al. ................... 348/837 |
| 6,561,600 | B1 | | 5/2003 | Seeley et al. |
| 6,616,598 | B2 | | 9/2003 | Kaushansky et al. |
| 6,654,127 | B2 | | 11/2003 | Richardson |
| 7,032,973 | B2 | * | 4/2006 | Reubeuze .............. 297/378.13 |
| 2003/0039094 | A1 | * | 2/2003 | Sarkinen et al. ............. 361/681 |
| 2004/0188579 | A1 | | 9/2004 | Manceor |

OTHER PUBLICATIONS

International Search Report for EP 05257001.7 Mar. 3, 2006.

* cited by examiner

*Primary Examiner*—Anatoly Vortman
*Assistant Examiner*—Quinn Hunter
(74) *Attorney, Agent, or Firm*—McAndrews, Held & Malloy, Ltd.; Peter J. Vogel; Michael A. Dellapenna

(57) ABSTRACT

A retention system for restraining and releasing a movable monitor including a monitor, a latch bail, and a latching assembly with one of the latch bail and the latching assembly being connected to the monitor. The latching assembly includes a latch base, a latch, and a tensioning device. The latch base has at least one ear and the latch has at least one arm. The latch is pivotally connected to the latch base such that the latch is rotatable between closed and open positions. The tensioning device engages the latch and the latch base such that the tensioning device pulls the latch toward either of the open or closed positions. The latching assembly receives the latch bail such that the latch bail is retained between the ear and the arm when the latch is in the closed position.

18 Claims, 9 Drawing Sheets

RETENTION MECHANISM FOR MOBILE MONITORS

BACKGROUND OF THE INVENTION

The present invention relates to a mechanism for retaining and releasing movable monitors or screens. More particularly, certain embodiments of the present invention relate to a latching system for retaining and releasing a liquid crystal display ("LCD") monitor mounted on an articulating arm system.

Flat screen monitors, specifically, LCD monitors, are becoming increasingly popular computer accessories in the business and medical worlds. Because of their thin profile and light weight, flat screen monitors take up less space than conventional monitors and may be mounted to mobile actuation arm systems. These actuation arms are similar to those commonly used with lamps and lighting systems and have different pivot points such that the monitors may be moved to any number of desirable orientations. The maneuverability of a monitor is an extremely useful feature. For example, the user can move the monitor to a more visible and ergonomically correct position depending on the user's location and activity. The maneuverability of the monitor is especially beneficial during a medical procedure where the monitor may have to be adjusted to different positions during the course of the procedure.

However, the maneuverability of the monitors also provides some drawbacks. Because the monitors are light-weight and the actuation arms can wear down and become loose at the pivot points, the monitors can at times be inadvertently moved by the slightest contact or even drift out of position on their own. This "free movement" of the monitors puts them at a high risk for damage and also makes them a nuisance or even a safety hazard to the user.

Therefore, a need exists for a mechanism for retaining and releasing mobile monitors such that their movement may be better controlled.

BRIEF SUMMARY OF THE INVENTION

Certain embodiments of the present invention include a retention system for restraining a movable monitor including a monitor, a latch bail, and a latching assembly with one of the latch bail and the latching assembly being connected to the monitor. The latching assembly includes a latch base, a latch, and a tensioning device. The latch base has at least one ear and the latch has at least one arm. The latch is pivotally connected to the latch base such that the latch is rotatable between closed and open positions. The tensioning device engages the latch and the latch base such that the tensioning device pulls the latch toward either of the open or closed positions. The latching assembly receives the latch bail such that the latch bail is retained between the ear and the arm when the latch is in the closed position.

Certain embodiments of the invention include a retention system for restraining and releasing a monitor mounted on a movable actuation arm. The system includes a monitor, a latch bail connected to the monitor, and a latching assembly. The latching assembly includes a latch base, a latch, and a tensioning device. The latch base has at least one ear and the latch has at least one latch arm. The latch base is connected to a mounting surface and the latch is connected to the latch base such that the latch is rotatable with respect to the latch base between a closed and open position. The tensioning device engages the latch and the latch base such that the tensioning device retains the latch in either of the open or closed positions. The latching assembly receives the latch bail between the ear and the latch arm when the latch is in the closed position such that the monitor is restrained in movement. The latch is movable toward the open position such that the latch bail is released from between the ear and the latch arm.

Certain embodiments of the invention include a method for restraining a monitor connected to a movable actuation arm. The method further includes providing a monitor with a latch bail connected thereto and providing a latching assembly having a latch rotatably connected to a latch base and movable about the latch base between an open and a closed position. The method further includes moving the monitor toward the latching assembly and engaging the latching assembly such that, where the latching assembly is in the open position, the latch rotates to the closed position to restrainably receive the latch bail, and where the latching assembly is in the closed position, the latch rotates toward the open position to such a degree that the latch bail is received between the latch and the latch base and the latch rotates back to the closed position to restrainably receive the latch bail.

Figure 1:
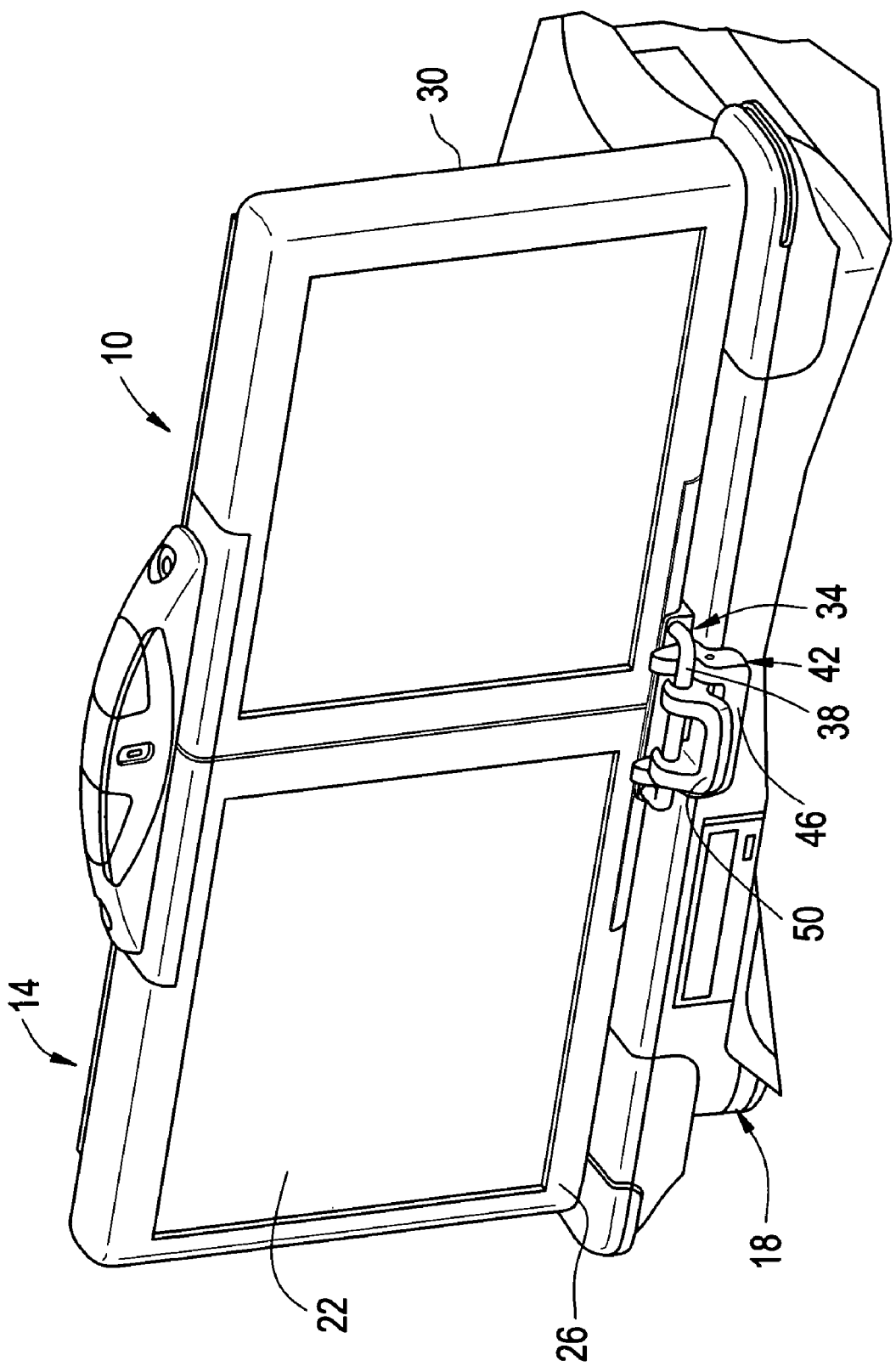
FIG. 1 illustrates an isometric view of a conventional computer assembly formed according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentality shown in the attached drawings.

DETAILED DESCRIPTION OF THE INVENTION

FIG. 1 illustrates an isometric view of a computer assembly 10. The computer assembly includes a monitor 14 and a hard drive 18. By way of example only, the monitor 14 may be an LCD monitor. The monitor 14 has at least one screen 22 on a front side 26 and is connected at a back side 30 to an actuation arm (not shown). The actuation arm allows for an operator to freely move the monitor 14 to any number of different desired positions such that the operator can view the screen 22. The monitor 14 also includes handle-shaped latch bail 34 extending out from the front side 26 thereof. The latch bail 34 may be connected to the monitor 14 by any number methods or may be integral with the monitor 14. The latch bail 34 may be made out of plastic or metal or any other number of other suitable materials. By way of example only, the latch bail 34 may be made of aluminum. The latch bail 34 has a rod 38 that is oriented generally parallel with the front side 26 of the monitor 14. In alternative embodiments, the latch bail 34 may have any number of different shapes and orientations, for example, the rod 38 of the latch bail 34 may extend downward or forward perpendicularly from the front side 26.

The computer assembly 10 also includes a docking or latching assembly 42. The latching assembly 42 includes a latch base 46 connected to a latch 50. The latch base 46 is connected by any number of different methods to the hard drive 18. Alternatively, the latch base 46 may be connected to a desk top or any other grounded or secured mounting surface proximate the monitor 14. The latch assembly 42 may be made of any low friction inducing material. By way of example only, the latch assembly 42 is made of plastic. The latch bail 34 is received within the latching assembly 42 between the latch base 46 and the latch 50 such that the movement of the monitor 14 is limited in any direction. The latch assembly 42 may be opened such that the latch bail 34 is released and the monitor 14 may be moved.

Figure 2:
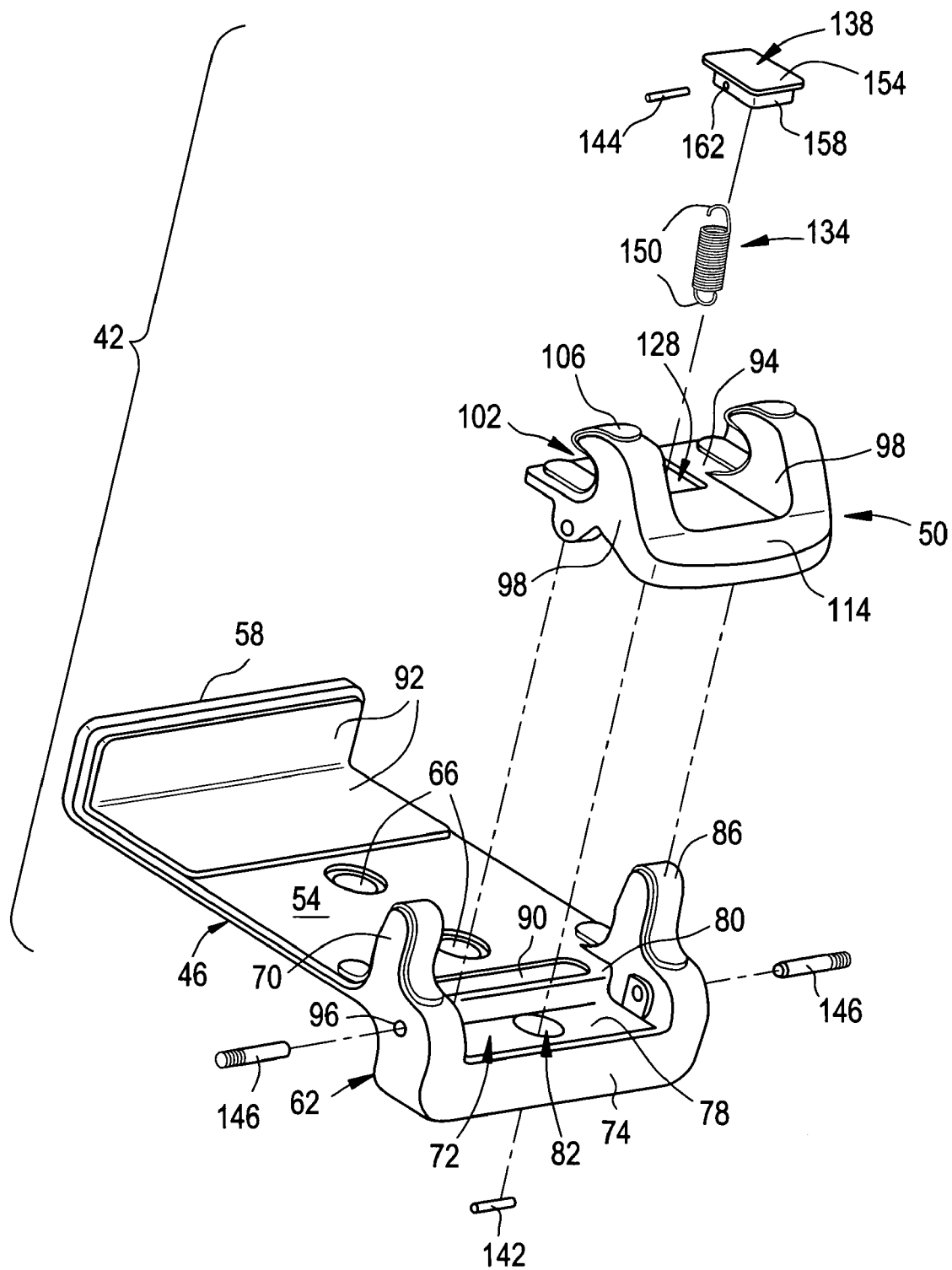
FIG. 2 illustrates an exploded isometric view of the latching assembly from FIG. 1 formed according to an embodiment of the present invention.

FIG. 2 illustrates an exploded isometric view of the latching assembly 42 of FIG. 1. The latch base 46 has a base plate 54 with an end wall 58 extending from one end and a latching section 62 extending from the opposite end. The latching section 62 includes rounded ears 70 extending out at opposite sides of the latching section 62. A cutout 72 defined by an engagement surface 78 and a ledge 80 extends between the ears 70 along the latching section 62. The latching section 62 includes a base lip 74 that extends downward and perpendicular from the engagement surface 78 away form the ears 70. The engagement surface 78 includes a spring aperture 82 extending therethrough. The ears 70 include pinholes 96 extending therethrough to the cutout 72. The ears 70 have a wear-impact surface 86 extending along the surfaces thereof. The base plate 54 further includes apertures 66 through which screws or other fasteners may be inserted to connect the latch base 46 to a mounting surface. The base plate 54 includes a stop surface 90 proximate the latching section 62. A wear-impact surface 92 extends along a portion of the base plate 54 and the end wall 58. In operation, the latch base 46 receives the monitor 14 (FIG. 1) along the base plate 54 between the end wall 58 and the ears 70. The wear impact surfaces 92 and 86 on the end wall 58 and the ears 70, respectively, operates to protect both the latch base 46 and monitor 14 from wear.

Figure 3:
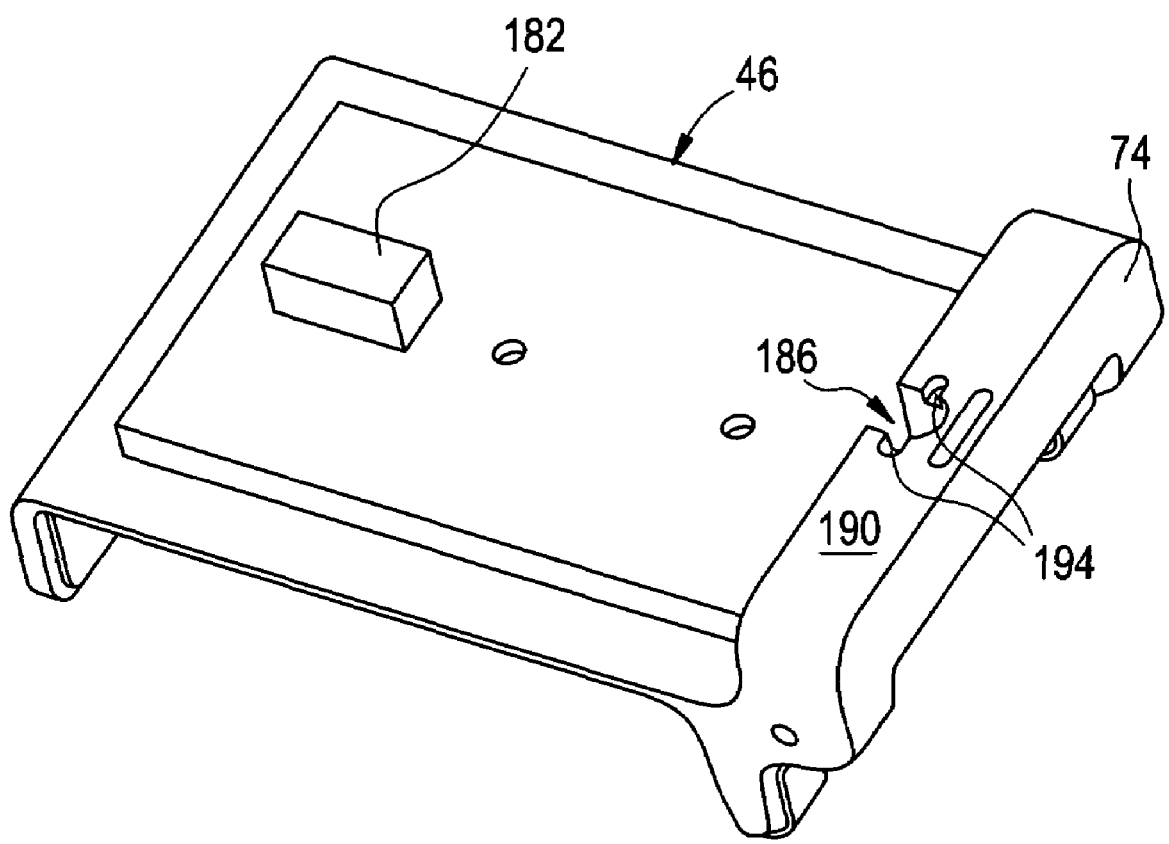
FIG. 3 illustrates a bottom isometric view of the latch base from FIG. 2.

FIG. 3 illustrates a bottom isometric view of the latch base 46. The base plate 54 has a support block 182 extending therefrom for supporting the latch base 46 when the latch base 46 is mounted to a surface. The lip 74 includes a thin gap 186 along a bottom surface 190 thereof. The gap 186 is partly defined by ledges 194 on opposite sides thereof such that the gap 186 can receive and retain a pin 142 (FIG. 2) therein against the ledges 194.

Returning to FIG. 2, the latch 50 includes a base 94 with curved arms 98 from opposite sides thereof to define gaps 102 between the arms 98 and the base 94. The arms 98 have wear-impact surfaces 106 extending along the surface thereof. The base 94 includes a curved handle 114 extending therefrom proximate the arms 98.

Figure 4:
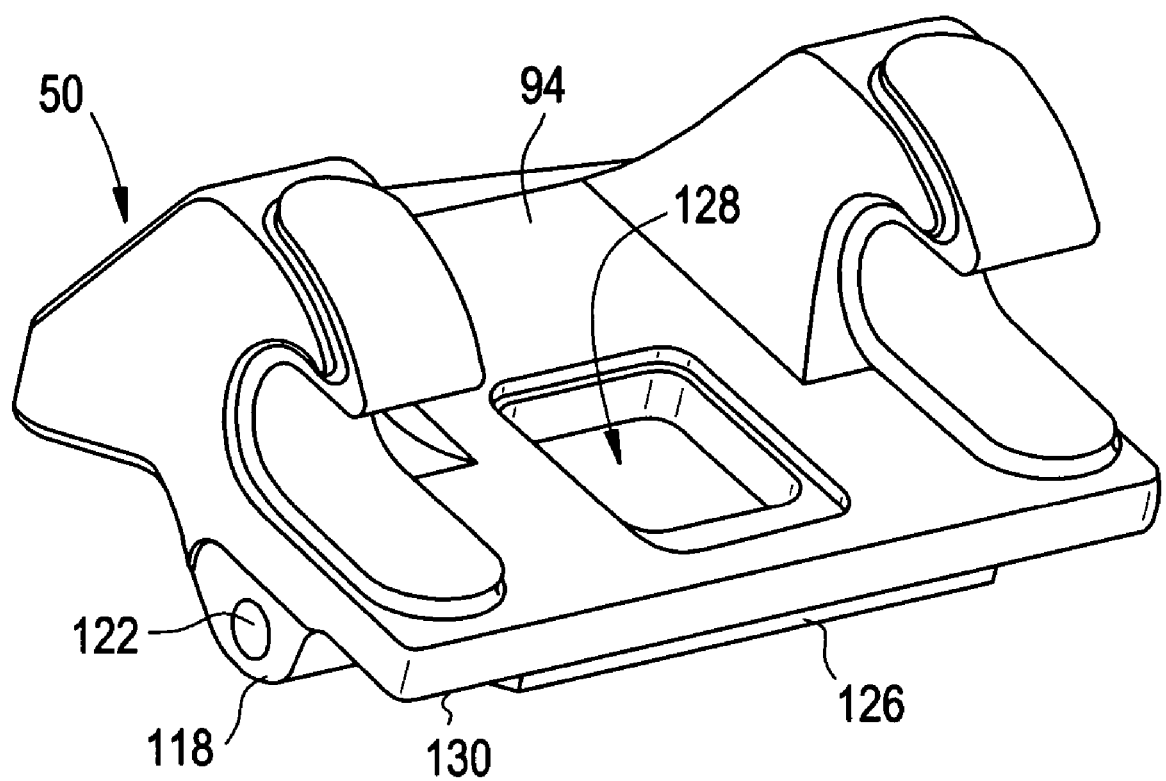
FIG. 4 illustrates an isometric view of the latch from FIG. 2.

FIG. 4 illustrates an isometric view of the latch 50 of FIG. 2. The base 94 of the latch 50 has a square hole 128. The base 94 also has a bottom side 130 from which extends a rounded pivot section 118. The pivot section 118 includes an aperture 122 extending therethrough. A stop bar 126 also extends from the bottom side 130 of the base 94.

Returning to FIG. 2, the latch assembly further includes a tensioning device 134, a tensioning device retainer 138, and pin 142, pin 144, and pins 146. When the latching assembly 42 is assembled, the latch 50 is positioned within the cutout 72 of the latch base 46 with the arms 98 curved toward the ears 70, the pivot section 118 engaging the engagement surface 78 and the ledge 80, and the aperture 122 in the pivot section 118 aligned with the pinholes 96 in the ears 70. The pins 146 are then inserted through the pinholes 96 of the ears 70 into the aperture 122 of the pivot section 118 to secure the latch 50 to the latch base 46. The latch 50 can be pivoted about the pins 146. The tensioning device or spring 134 has hooks 150 on opposite ends thereof. In an alternative embodiment, the tensioning device may any number of other devices that can be connected to two different points and be in tension between the points.

Figure 5:
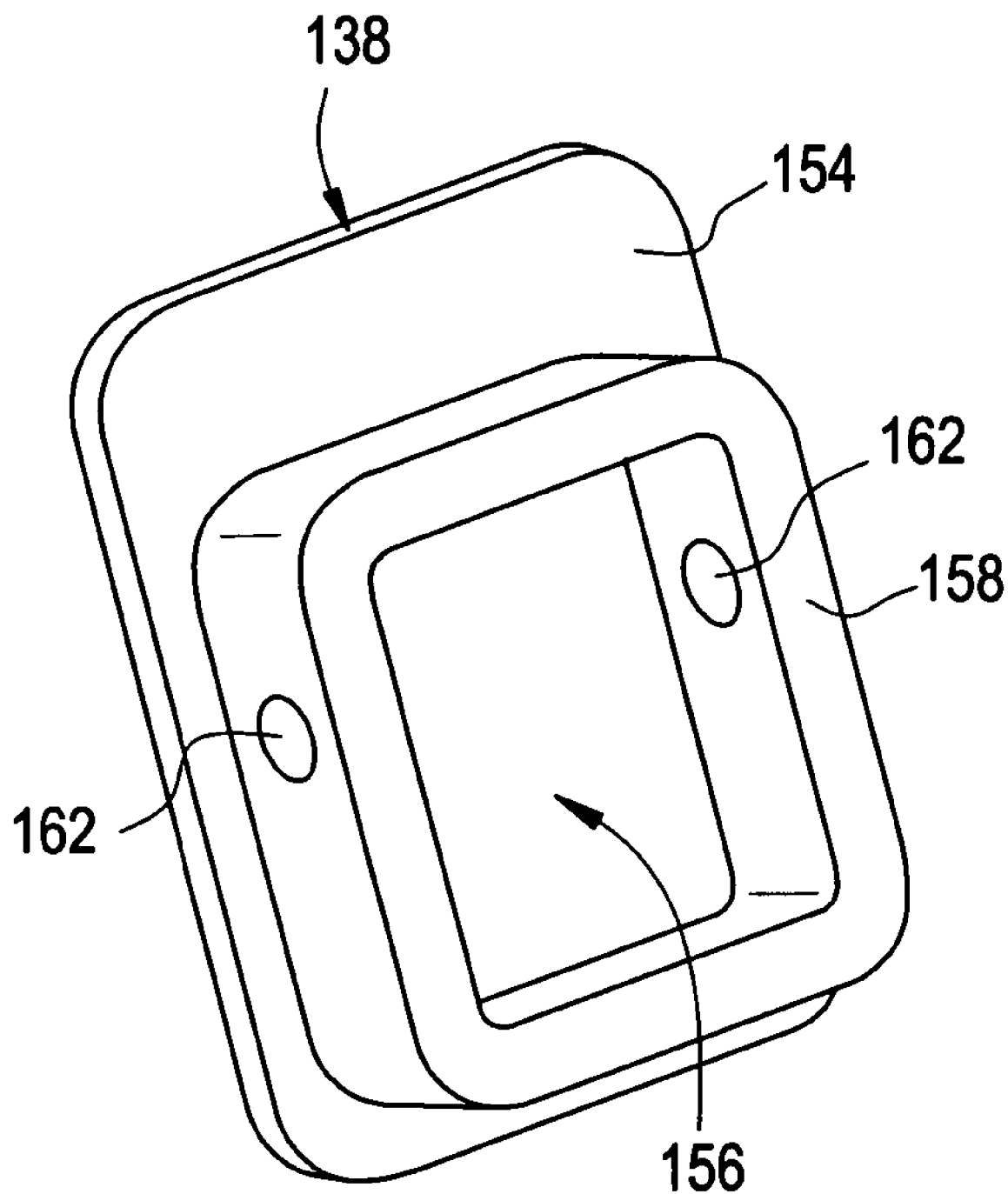
FIG. 5 illustrates a bottom isometric view of the tensioning device retainer from FIG. 2.

FIG. 5 illustrates a bottom isometric view of the tensioning device retainer 138 of FIG. 2. The cap-shaped tensioning device retainer 138 has a base 154 from which extends a square-shaped wall 158 defining a hollow interior section 156. The wall 158 has apertures 162 extending through parallel sections thereof. By way of example only, the tensioning device retainer 138 is made of aluminum.

Returning to FIG. 2, to further assemble the latching assembly 42, a hook 150 of the spring 134 is inserted into the spring aperture 82. Pin 142 is extended through the hook 150 and the pin 142 is received in the gap 186 (FIG. 3) under the lip 74. The other hook 150 of the spring 134 is inserted into the interior section 156 (FIG. 5) of the tensioning device retainer 138. The pin 144 is then inserted through the apertures 162 in the tensioning device retainer 138 and the hook 150 to hold the spring 134 to the tensioning device retainer 138. The tensioning device retainer 138 is then positioned in latch 50 the such that the wall 158 is received into the hole 128 of the latch 50 and the base 154 of the tensioning device retainer 138 engages the base 94 of the latch 50. The spring 134 is in tension between the latch base 46 and the tensioning device retainer 138 and holds the latch 50 to the latch base 46.

Figure 6:
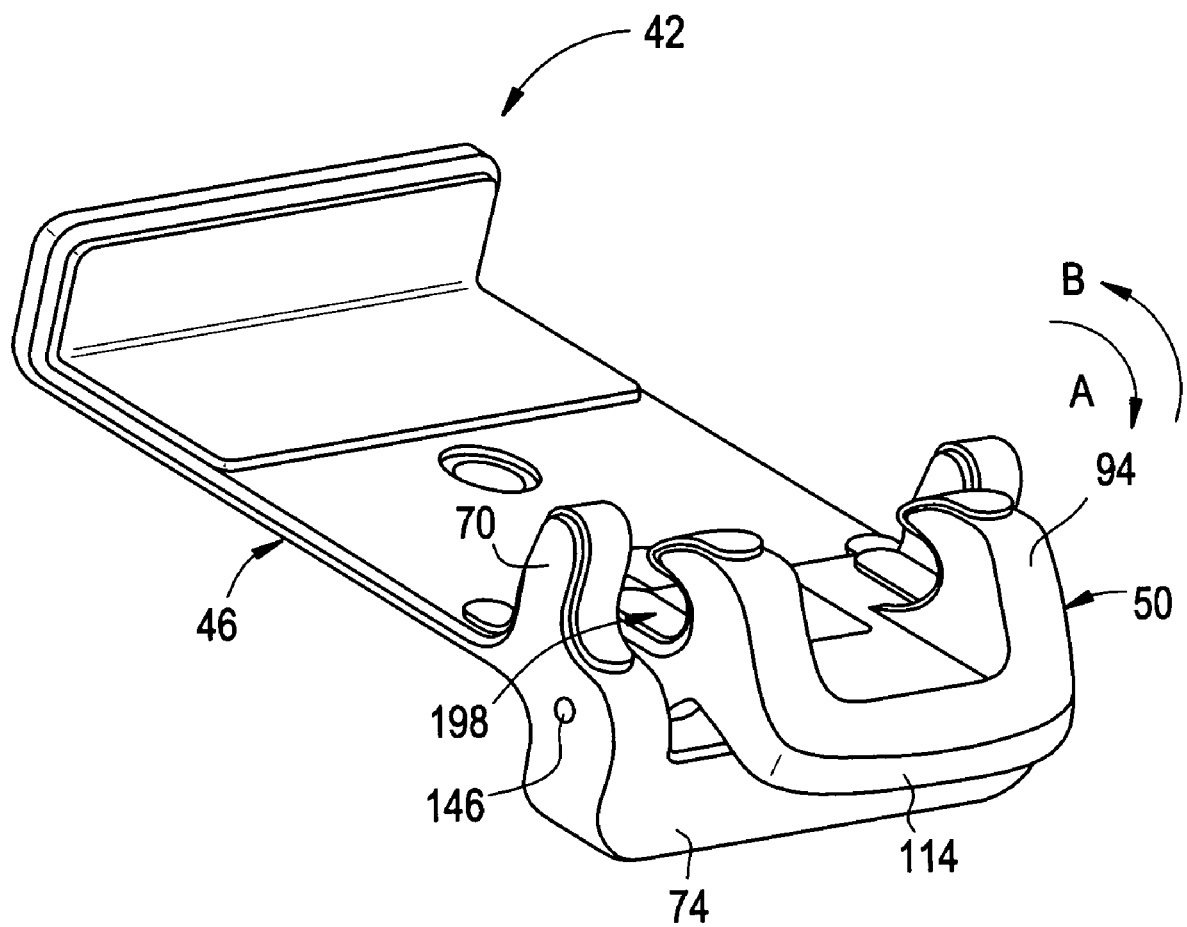
FIG. 6 illustrates an isometric view of the latching assembly from FIG. 1.

FIG. 6 illustrates an isometric view of the assembled latching assembly 42 from FIG. 1. The latching assembly 42 is assembled such that the latch 50 is in the closed position where the stop bar 126 (FIG. 4) of the latch 50 engages the stop surface 90 (FIG. 2) on the latch base 46 and the arms 98 and ears 70 define an enclosed region 198. The spring 134 (FIG. 2) holds the latch 50 in the closed position. In operation, the latch 50 can rotate about the pins 146 in the direction of arrow A to an open position where the lip 74 of the latch base 46 resistibly engages the handle 114 of the latch 50. When the latch 50 is in the open position, it can be rotated about the pins 146 in the direction of arrow B from the open position back to the closed position. By way of example only, the latch 50 can rotate within a range of 40-45 degrees between the open and closed positions. By further way of example, the latch 50 can rotate 43.7 degrees between the open and closed positions. When the latch 50 has been rotated a certain distance from the closed position toward the open position, by way of example only, approximately 22 degrees, the spring 134 automatically shifts from pulling the latch 50 toward the closed position and applies a moment to the latch 50 to pull the latch 50 toward the open position. The spring 134 holds the latch 50 in the open position, but as the latch 50 is rotated a certain distance from the open position toward the closed position, the spring 134 automatically shifts from pulling the latch 50 toward the open position and applies a moment to the latch 50 to pull the latch 50 toward the closed position. In this operation, the spring 134 serves as a toggle device that can pull and hold the latch 50 in either position.

Figure 7:
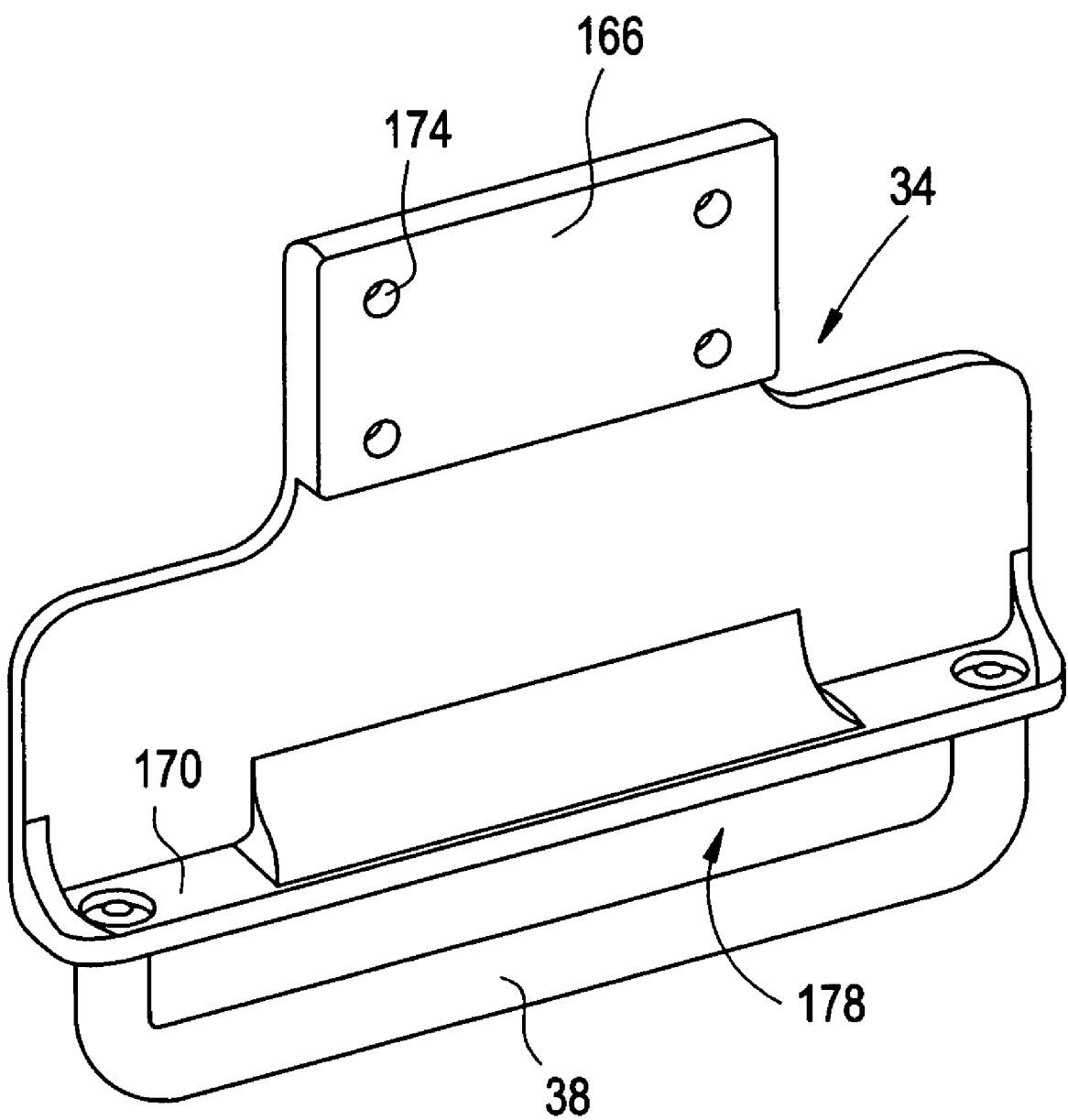
FIG. 7 illustrates an isometric view of the latch bail from FIG. 1.

FIG. 7 illustrates an isometric view of the latch bail 34 from FIG. 1. The latch bail 34 includes a base plate 166 formed perpendicularly with a side wall 170. The base plate 166 includes apertures 174 through which fasteners may be inserted to connect the base plate 166 to the monitor 14 (FIG. 1). The handle-shaped rod 38 extends from the side wall 170 to define a gap 178.

Figure 8:
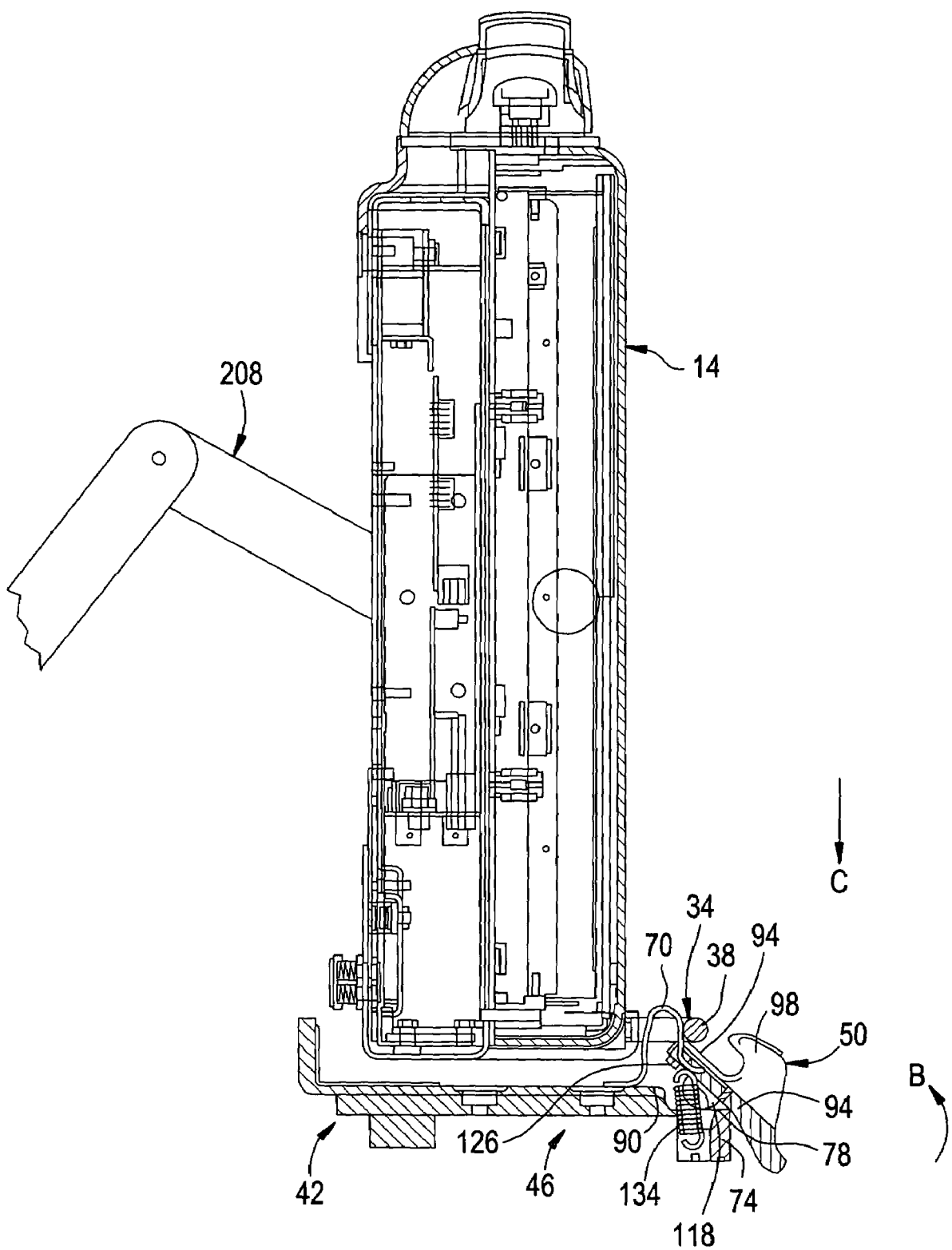
FIG. 8 illustrates a cross-sectional side view of the monitor from FIG. 1 and the latching assembly from FIG. 6 in the open position.

FIG. 8 illustrates a cross-sectional side view of the monitor 14 from FIG. 1 and the latching assembly 42 from FIG. 6 in the open position. When the latching assembly 42 is in the open position, the base 94 of the latch 50 engages the lip 74 of the latch base 46 and the pivot section 118 of the latch 50 engages the engagement surface 78 of the latch base 46. The base 94 of the latch 50 extends out beyond the ears 70 of the latch base 46 between the ears 70 and the arms 98 of the latch 50. The orientation of pivot section 118 on the engagement surface 78 with respect to the orientation of the spring 134 allows for the spring 134 to be in tension to hold the latch 50 in the open position.

In operation, to dock the latch bail 34 within the latching assembly 42, the monitor 14 is moved on an actuation arm 208 toward the latching assembly 42 such that the ears 70 of the latch base 46 are received into the gap 178 (FIG. 7) of the latch bail 34 and the rod 38 of the latch bail 34 engages the base 94 of the latch 50. As the rod 38 pushes against the base 94 in the direction of arrow C, the latch 50 is pushed to rotate in the direction of arrow B against the tension of the spring 134. After the latch 50 has rotated a certain distance in the direction of arrow B, the orientation of the pivot section 118 on the engagement surface 78 with respect to the orientation of the spring 134 allows for the spring 134 in tension to pull the latch 50 toward the closed position. The latch 50 then moves to the closed position where the stop bar 126 engages the stop surface 90 of the latch base 46. By way of example only, the latch 50 has to be rotated approximately 22 degrees from the open position toward the closed position for the spring 134 to pull the latch 50 into the closed position. In this operation, the spring 134 serves as a toggle device that can shift from automatically pulling the latch 50 to the open position to pulling the latch 50 to the closed position after the latch 50 has been rotated a certain distance to the closed position.

Figure 9:
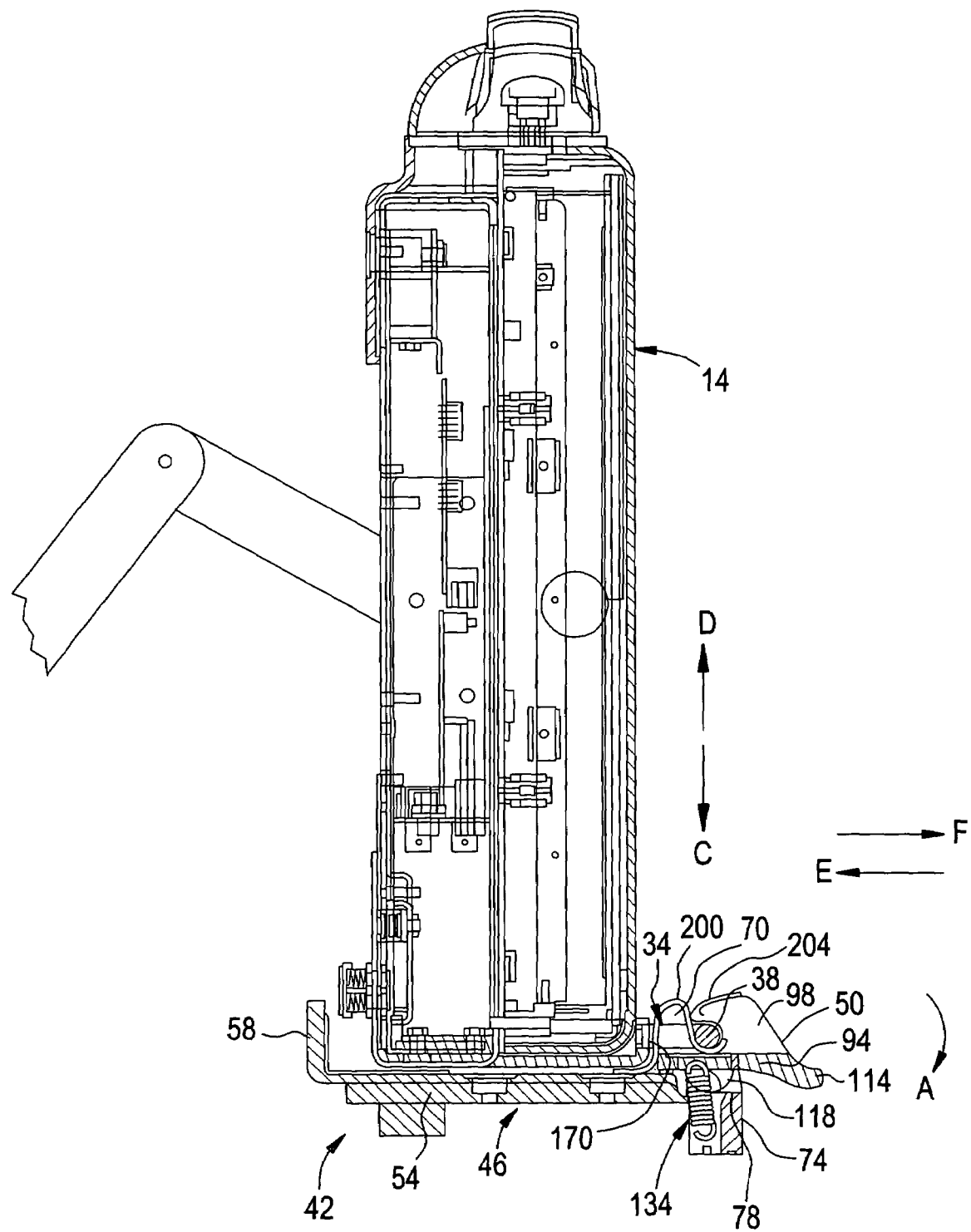
FIG. 9 illustrates a cross-sectional side view of the monitor from FIG. 1 and the latching assembly from FIG. 6 in the closed position.

FIG. 9 illustrates a cross-sectional side view of the latching assembly 42 receiving the latch bail 34 and in the closed position. The latch 50 is in the closed position and the rod 38 of the latch bail 34 is received within the enclosed region 198 (FIG. 6) between the ears 70 of the latch base 46 and the arms 98 of the latch 50. Also, the monitor 14 is situated on the base plate 54 of the latch base 46 between the ears 70 and the end wall 58. The spring 134 is in tension to hold the latch 50 in the closed position about the latch bail 34. In this manner, the latching assembly 42 generally retains or restrains the monitor 14 from moving in any number of directions. Specifically, the ears 70 prevent the latch bail 34 from moving in the direction of arrow E by engaging the rod 38 and prevent the latch bail 34 from moving in the direction of arrow F by engaging the side wall 170 of the latch bail 34. Also, the latch 50 prevents the latch bail 34 from moving in the direction of arrow D because as the rod 38 moves in the direction of arrow D, the rod 38 engages the arm 98 at a pivot point such that the arm 98 does not rotate.

In order to release the latch bail 34 from the latching assembly 42 so that the monitor 14 can be freely moved, the operator simply depresses the handle 114 of the latch 50 in the direction of arrow A. After the latch 50 has been rotated a certain distance in the direction of arrow A, the orientation of the pivot section 118 on the engagement surface 78 with respect to the orientation of the spring 134 allows for the spring 134 to be in tension to pull the latch 50 toward the open position. The latch 50 then rotates to the open position where the base 94 of the latch 50 engages the lip 74 of the latch base 46. The tension load on the latch 50 as it is rotated toward the open position assists to eject the latch bail 34 during undocking. The operator may then pull the latch bail 34 away from the latching assembly 42. By way of example only, the latch 50 has to be rotated approximately 22 degrees from the closed position toward the open position for the spring 134 to pull the latch 50 into the open position.

Alternatively, an operator can secure the latch bail 34 into the latching assembly 42 when the latching assembly 42 in already in the closed position. When the latching assembly 42 is in the closed position as shown in FIG. 9, the monitor 14 is moved toward the latching assembly 42 such that the rod 38 engages the curved ears 70 at an inside surface or ramp 200 and the curved arms 98 at a top surface or ramp 204 in the general direction of Arrow C. Because the wear impact surfaces 86 and 106 of the ears 70 and arms 98, respectively, are smooth and create a minimal amount of friction, the arms 98 and the ears 70 are able to slidingly guide the rod 38 of the latch bail 34 therebetween such that the latch bail 34 pushes the arms 98, and thus the entire latch 50, in the direction of arrow A toward the open position. After the rod 38 slides past the top surface 204 of the arms 98 and against the base 94 of the latch 50 between the arms 98 and the ears 70, the latch 50 is pulled back into the closed position by the spring 134 to secure the latch bail 34 in the latching assembly 42. Thus, the operator need not even touch the latch 50 to secure the latch bail 34 into the latching assembly 42.

In an alternative embodiment, the latching assembly 42 may be used to restrain any number of other kinds of monitors, screens, televisions, etc. that are connected to a free moving actuation arm system. In another alternative embodiment, the latch bail 34 may have any number of other shapes and/or orientations that allow for it to be restrained between the arms 98 and ears 70 of the latching assembly 42. In another alternative embodiment, the latching assembly 42 may be structured and oriented such that it can receive the latch bail 34 from any number of different directions and orientations besides from above in the downward direction of Arrow C. For example, the latching base 46 and the latch 50 may be structured to extend outward in the direction opposite of the monitor 14 and receive the latch bail 34 from the direction of Arrow E. In a further alternative embodiment, the ears 70 of the latch base 46 and the arms 98 of the latch 50 may overlap each other or contact each other or one may be received within the other when the latch 50 in the closed position. Alternatively, the latch base 46 may include only one ear 70 or more than two ears 70 and the latch 50 may include only one arm 98 or more than two arms 98. Alternatively, the latch base 46 may include the curved arms 98 and the latch 50 may include the rounded ears 70. In a further alternative embodiment, the latching assembly 42 may be connected to the monitor 14 and the latch bail 34 may be connected to a mounting surface such that the latching assembly 42 on the monitor 14 is operated to secure the latching assembly 42 to the latch bail 34 connected to the mounting surface.

The latching assembly of the different embodiments provides a number of benefits. First, the latching assembly provides a way to easily restrain a monitor connected to an actuation arm when an operator does not want the monitor to be moved. In this way, the latching assembly prevents the monitor from being damaged or becoming a nuisance for the operator.

Second, the latch, when assembled with the tensioning device, becomes an over center mechanism that allows the system to receive and engage the latch bail in an open or closed configuration and allows the latch to remain in either the opened or closed positions. In this way, the latch operates as a toggle device. This toggle system is extremely helpful in restraining the monitor because an operator does not need to touch the latch in order to dock the latch bail in the latching system. In other words, the operator only needs one hand to guide the latch bail into the latching assembly regardless of whether the latching assembly is in the open position or not. Alternatively, only one hand is necessary to release the latch bail from the latching system because, subsequent to toggling the latch to the open position, the operator only needs to pick up the latch bail to remove the latch bail from the latch assembly. The tension load on the latch assists to eject the latch bail during undocking. Such a system is obviously beneficial in an office situation where the operator may be on the phone or engaged in some other activity. The system is especially beneficial in an operating room situation where a medical professional may only have one hand available to restrain or release a monitor.

Third, one of the unique aspects of the latching assembly is the fact that it is clearly visible to the operator. Ergonomic studies have shown that unless the latching device and the item being latched are visible to the operator, the docking process becomes difficult.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A retention system for restraining a movable monitor, comprising:
   a monitor;
   a latch bail; and
   a latching assembly, one of said latch bail and said latching assembly being connected to said monitor, said latching assembly including a latch base, a latch, and a tensioning device, said latch base having at least one ear and a generally flat engagement surface at an end of said latch base proximate said at least one ear and said latch having at least one arm, said latch being pivotally connected to said latch base such that said latch is rotatable between a closed and open position, said tensioning device engaging said latch and said latch base such that said tensioning device pulls said latch toward either of said open or closed positions, wherein said latch has a pivot section that engages and moves with respect to said latch base on said engagement surface, said latch rotating about said pivot section between first and second ranges, wherein when said pivot section is rotated within said first range, said pivot section is oriented with respect to said tensioning device such that said tensioning device pulls said latch to said closed position and when said pivot section is rotated within said second range, said pivot section is oriented with respect to said tensioning device such that said tensioning device pulls said latch to said open position,
   said latching assembly receiving said latch bail such that said latch bail is retained between said ear and said arm when said latch is in said closed position.

2. The retention system of claim 1, wherein said latch has a base and when said latch is in said open position, said latch bail engages said base such that said latch rotates toward said closed position and said tensioning device pulls said latch in said closed position.

3. The retention system of claim 1, wherein said arm and ear each have surfaces that guide said latch bail when said latch bail engages said latching assembly in said closed position such that said latch bail moves said latch toward said open position to a degree that said latch bail moves between said ear and said arm.

4. The retention system of claim 1, wherein said latch includes a handle, said handle being movable such that said latch rotates from said closed position toward said open position.

5. The retention system of claim 1, wherein said tensioning device pulls said latch toward said closed position when said latch is rotated within a certain range from said closed position, said tensioning device pulling said latch toward said open position when said latch is rotated beyond said certain range from said closed position.

6. The retention system of claim 1, wherein said tensioning device pulls said latch toward said open position when said latch is rotated within a certain range from said open position, said tensioning device pulling said latch toward said closed position when said latch is rotated beyond said certain range from said open position.

7. The retention system of claim 1, wherein said latching assembly includes a tensioning device retainer, said tensioning device retainer connected to a first end of said tensioning device and engaging said latch, said latch base connected to an opposite second end of said tensioning device, said tensioning device being in tension between said tensioning device retainer and said latch base such that said tensioning device pulls said latch toward said closed position or said open position.

8. The retention system of claim 1, further including a mounting surface, wherein the other of said latch bail and said latching assembly that is not connected to said monitor being connected to said mounting surface, such that when said latch bail is received in said closed latch between said ear and said arm, said monitor is restrained in its movement away from said mounting surface.

9. The retention system of claim 1, wherein said monitor is a liquid crystal display monitor.

10. The retention system of claim 1, wherein said monitor is mounted to a movable actuation arm and when said latch bail is retained within said latching assembly, said monitor is limited in its movement.

11. A retention system for restraining and releasing a monitor mounted on a movable actuation arm, comprising:
   a monitor;
   a latch bail connected to said monitor; and
   a latching assembly including a latch base, a latch, and a tensioning device, said latch base having at least one ear and a generally flat engagement surface at an end of said latch base proximate said at least one ear and said latch having at least one latch arm, said latch base being connected to a mounting surface, said latch being connected to said latch base such that said latch is rotatable with respect to said latch base between a closed and open position, said tensioning device engaging said latch and said latch base such that said tensioning device pulls said latch toward either of said open or closed positions, wherein said latch has a pivot section that engages and moves with respect to said latch base on said engagement surface, said latch rotating about said pivot section between first and second ranges, wherein when said pivot section is rotated within said first range, said pivot section is oriented with respect to said tensioning device such that said tensioning device pulls said latch to said closed position and when said pivot section is rotated within said second range, said pivot section is oriented with respect to said tensioning device such that said tensioning device pulls said latch to said open position, said latching assembly receiving said latch bail between said ear and said latch arm when said latch is in said closed position such that said monitor is restrained in movement, said latch being movable toward said open position such that said latch bail is released from between said ear and said latch arm.

12. The retention system of claim 11, wherein said latch has a base and when said latch is in said open position, said latch bail engages said base such that said latch rotates toward said closed position and said tensioning device pulls said latch in said closed position.

13. The retention system of claim 11, wherein said latch arm and ear each have surfaces that guide said latch bail when said latch bail engages said latching assembly in said closed position such that said latch bail moves said latch toward said open position to a degree that said latch bail moves between said ear and said latch arm.

14. The retention system of claim 11, wherein said latch includes a handle, said handle being movable such that said latch rotates from said closed position toward said open position.

15. The retention system of claim 11, wherein said tensioning device pulls said latch toward said closed position when said latch is rotated within a certain range from said closed position, said tensioning device pulling said latch toward said open position when said latch is rotated beyond said certain range from said closed position.

16. The retention system of claim 11, wherein said tensioning device pulls said latch toward said open position when said latch is rotated within a certain range from said open position, said tensioning device pulling said latch toward said closed position when said latch is rotated beyond said certain range from said open position.

17. The retention system of claim 11, wherein said monitor is a liquid crystal display monitor.

18. A method for restraining a monitor connected to a movable actuation arm, comprising:

providing a latching assembly having a latch rotatably connected to a latch base having a generally flat engagement surface at an end thereof, the latch being and movable about the latch base between an open and a closed position, wherein the latch has a pivot section that engages and moves with respect to the engagement surface of the latch base when the latch moves about the latch base;

providing a latch bail;

providing a monitor connected to one of the latching assembly and latch bail;

moving the monitor toward the other of the latching assembly and latch bail that is not connected to the monitor; and engaging the latching assembly such that, where the latching assembly is in the open position, the latch rotates with the pivot section about the engagement surface of the latch base to the closed position to restrainably receive the latch bail, and where the latching assembly is in the closed position, the latch rotates with the pivot section about the engagement surface of the latch base toward the open position to such a degree that the latch bail is received between the latch and the latch base and the latch rotates back to the closed position to restrainably receive the latch bail.

* * * * *